United States Patent
Priegelmeir et al.

(10) Patent No.: US 7,582,345 B2
(45) Date of Patent: Sep. 1, 2009

(54) HINGE APPARATUS

(75) Inventors: Walter Priegelmeir, Bauemenheim (DE); Gerhard Heilmeier, München (DE)

(73) Assignee: SGL Carbon AG, Wiesbaden (DE)

( * ) Notice: Subject to any disclaimer, the term of this patent is extended or adjusted under 35 U.S.C. 154(b) by 311 days.

(21) Appl. No.: 11/475,518

(22) Filed: Jun. 27, 2006

(65) Prior Publication Data

US 2007/0000091 A1    Jan. 4, 2007

(30) Foreign Application Priority Data

Jun. 29, 2005    (EP) .................. 05014009

(51) Int. Cl.
*B32B 3/10* (2006.01)
(52) U.S. Cl. .................. 428/60; 428/58; 428/172; 428/217
(58) Field of Classification Search .......... 428/58, 428/60, 172, 217; 16/225, DIG. 13; 244/131
See application file for complete search history.

(56) References Cited

U.S. PATENT DOCUMENTS

| | | | | |
|---|---|---|---|---|
| 4,134,019 A | * | 1/1979 | Koontz et al. | ............... 378/208 |
| 5,945,053 A | * | 8/1999 | Hettinga | ................. 264/171.13 |
| 6,168,379 B1 | | 1/2001 | Bauer | |
| 6,474,945 B1 | * | 11/2002 | Nakasato et al. | .............. 416/23 |

FOREIGN PATENT DOCUMENTS

| | | |
|---|---|---|
| DE | 1 475 532 | 3/1969 |
| DE | 197 18 671 C1 | 3/1999 |
| DE | 199 55 007 A1 | 3/2001 |
| EP | 0 875 647 A1 | 11/1998 |
| EP | 0 939 029 A2 | 9/1999 |
| EP | 1 085 152 A2 | 3/2001 |
| JP | 05096997 A * | 4/1993 |
| JP | 10-252018 | 9/1998 |

* cited by examiner

*Primary Examiner*—Alexander Thomas
(74) *Attorney, Agent, or Firm*—Laurence A. Greenberg; Werner H. Stemer; Ralph E. Locher

(57) ABSTRACT

A hinge apparatus is capable of reliably withstanding a great number of stressor cycles. A layer of an inflectable fiber-reinforced composite material is embedded between two layers of a fiber reinforced composite material of high stiffness. The latter are formed with a separating joint along the line of inflection.

12 Claims, 1 Drawing Sheet

HINGE APPARATUS

BACKGROUND OF THE INVENTION

Field of the Invention

The present invention relates to a hinge.

German patent DE 197 18 671 C1 describes a hinge for applications in space travel. That hinge is formed by a strip of a cured composite material which consists of two mutually interbonded fiber reinforced materials, one of these materials comprising a straight line separating joint, having a U or V shaped cross section for example, and the other material being inflected in the region of the separating joint. Useful fiber materials for the inflectable layer have a higher flexural strength and include plastic reinforced with aramid, polyethylene, polyamide or polyester fibers, for example. The separating joint layer consists of plastic reinforced with carbon, glass, ceramic or boron fibers.

The hinge is fabricated by a multi-ply construction of fibrous wovens being produced on a prismatic device and cured using standard processes. The thicknesses of the individual plies and also the plied construction depend on the planned use. The first ply preferably consists of aramid or similar fibers and the subsequent ply or plies of carbon fiber reinforced plastic (CFRP or CRP).

Next, the edge is broken by sanding. The CFRP layer is sanded until a narrow strip of the yellow aramid fiber becomes visible underneath the black CFRP laminate. This method permits very close control of the amount of material to be removed, and is the actual reason for commencing fabrication in an already angled configuration. The component is then demolded and inflected open, causing the resin still present in the aramid ply to spall off along the inflection without the fibers breaking.

Particular advantages of those hinges are the simplicity of construction, the inexpensive and convenient process of fabrication, and the low weight.

But hinges of that kind are only intended for a limited number of turning or pivoting movements in use. There are many applications in space travel where in fact just a single turning movement is required of the hinge, for example when unfolding solar generators or flat aerials or when deploying aerial dishes.

The suitability of this kind of hinge for just a limited number of turning or folding events is a decisive disadvantage, since it prohibits their use in devices in which a hinge is subject to frequent stress, i.e., a large number of turning or folding movements has to be managed reliably, for example in medical hardware.

The construction of the hinge described in the German patent DE 197 18 671 C1 is inappropriate in that the surface of the aramid fiber layer lies bare. As a result, this layer, which is absolutely essential for the function of the hinge, is directly exposed to a wide variety of wear stressors.

SUMMARY OF THE INVENTION

It is accordingly an object of the invention to provide a hinge apparatus, which overcomes the above-mentioned disadvantages of the heretofore-known devices and methods of this general type and which provides for a hinge that will reliably withstand a large number of stressor cycles.

It is a specific object that the hinge should be particularly suited and useful for medical and technical X-ray applications.

The choice of material of construction for this application sector of the hinge of the present invention shall take cognizance of the fact that the hinge needs to be transparent to X-rays without troublesome formation of artifacts.

With the foregoing and other objects in view there is provided, in accordance with the invention, a hinge apparatus, comprising:

first and second outer layers of a fiber-reinforced composite material of high strength and stiffness;

each of the first and second outer layers having a separating joint formed therein along a buckling line;

an interlayer of a fiber-reinforced composite material of high strength and stiffness disposed between the first and second outer layers; and a strip of material integrated in and interrupting the interlayer in a region of the buckling line, the strip of material being formed of inflectable fiber-reinforced plastic having a width of approximately 15 to 20 mm to either side of the buckling line, the strip of material forming a hinge configured to inflect along the separating joints when the hinge apparatus is actuated.

In other words, we have found that the above objects are achieved by a hinge in which a layer of flexible inflectable fiber reinforced composite material is situated between two layers of a fiber reinforced composite material of high strength and stiffness. These stiff outer layers are each provided with a separating joint at the line of inflection, i.e., at the turning axis of the folding movement. The hinge of the present invention thus includes a layer of an inflectable fiber reinforced composite material that is embedded between two layers of a fiber reinforced composite material of high stiffness which are each provided with a separating joint along the line of inflection, the embedded layer being inflected along the separating joints when the hinge is actuated.

In contrast to the state of the art represented by the above-mentioned German patent DE 197 18 671 C1, the hinge of the present invention has the inflectable material which is indispensable for its function situated in the interior of the hinge between two layers consisting of a material of high strength. The surface of the inflectable material is laid bare only immediately at the base of the separating joints. This ensures that the inflectable material in the hinge of the present invention is substantially protected against external wear stressors.

In accordance with an added feature of the invention, the inflectable fiber-reinforced plastic of the strip of material contains aramid fibers and a matrix of polyurethane resin. In a preferred embodiment, the fiber-reinforced plastic layer has a roughened surface.

In accordance with an additional feature of the invention, the composite material is a carbon fiber-reinforced plastic with a matrix of epoxy resin.

In accordance with another feature of the invention, the reinforcing fibers are present in the composite materials in the form of wovens, ribbons, non-crimped fabric (i.e., laids), or unidirectional non-crimped fabric (unidirectional laids).

In accordance with a further feature of the invention, the inflectable plastic material is reinforced by a woven fabric disposed in the region of the hinge with an orientation of crossing warp and fill threads of the woven fabric extending at substantially +45° and −45° to the separating joints.

In the alternative, the inflectable plastic material is reinforced by a unidirectional non-crimped fabric disposed in a region of the hinge with fibrous strands of the non-crimped fabric extending substantially perpendicularly to the separating joints.

In a preferred implementation, the hinge apparatus is suitable for use in medical or technical X-ray devices.

With the above and other objects in view there is also provided, in accordance with the invention, a hinge apparatus, comprising:

two mutually parallel layers of fiber-reinforced material having a high degree of stiffness;

an intermediate layer sandwiched between the mutually parallel layers;

each of the mutually parallel layers having a separating joint formed therein opposite one another defining a line of inflection substantially exposing the intermediate layer and defining an articulation hinge of the hinge apparatus;

the intermediate layer being formed of flexible fiber-reinforced composite material having reinforcing fibers with a high flexural strength extending across the line of inflection.

In accordance with a concomitant feature of the invention, the intermediate layer is formed with two interlayers integrated between the mutually parallel layers and a strip of material between and connecting the two interlayers and being disposed substantially symmetrically about the line of inflection and projecting a distance of several millimeters, such as approximately 5 mm, or approximately 10 mm, or approximately 15 mm, or approximately 20 mm, or approximately 25 mm, or approximately 30 mm, or more in between the mutually parallel layers on either side of the separating joint.

Other features which are considered as characteristic for the invention are set forth in the appended claims.

Although the invention is illustrated and described herein as embodied in a hinge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENT

Figure 1:
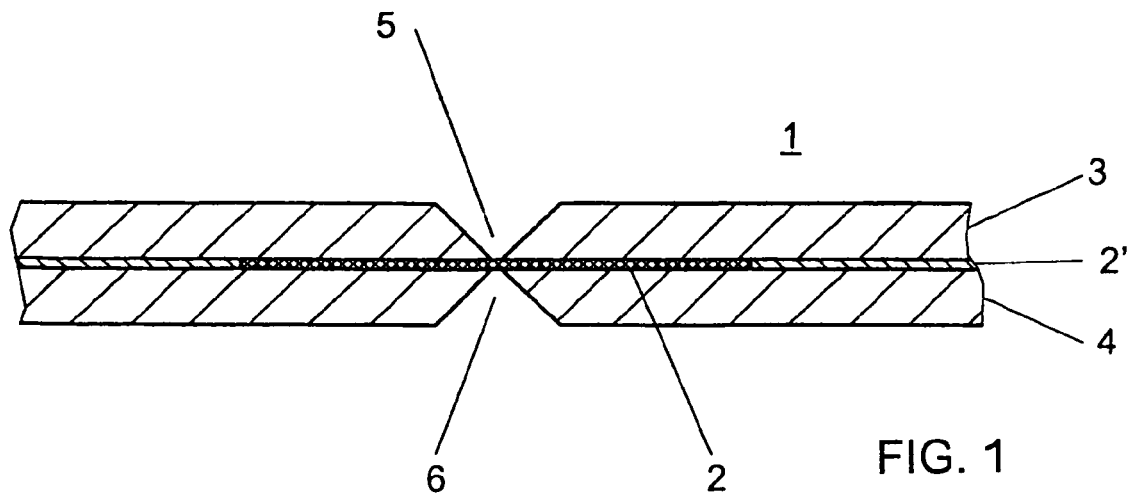
FIG. 1 is a sectional view taken through a preferred embodiment of the hinge apparatus of the present invention.

Referring now to the figures of the drawing in detail and first, particularly, to FIG. 1 thereof, an inflectable inner layer 2, also referred to as a buckling layer 2, of fiber-reinforced composite material contains a woven fabric or some other sheetlike textile construction formed from fibers of high flexural strength, preferably aramid fibers. The matrix of the composite material is formed by polyurethane resin, with which the woven fabric is impregnated.

In lieu of the aramid fibers, other fibers of high flexural strength (i.e., elongation at break, ultimate elongation) can be used.

The layers 3 and 4 are formed for example of carbon fiber reinforced plastic CFRP. These layers contain wovens or other sheetlike textile constructions formed from carbon fibers. The matrix of the CFRP is formed by epoxy resin, with which the woven carbon fiber fabric is impregnated.

CFRP is highly transparent to X-rays and hence the preferred material of construction for use of the hinge of the present invention in technical X-ray devices. The low absorption of X-rays by CFRP permits use of a low X-ray intensity without loss of diagnostic quality. Owing to the good mechanical properties of CFRP, lower thicknesses of component can be used compared with previously utilized materials.

The invention will now be described by way of example for hinges composed of the preferred material of construction, CFRP. Instead of CFRP, however, glass or ceramic fiber reinforced composite material can be used depending on the intended application.

The reinforcing fibers in the buckling layer 2 or/and in layers 3 and 4 can be present for example in the form of wovens, non-crimped fabrics, in particular unidirectional (UD) non-crimped fabrics, or ribbons.

Figure 3:
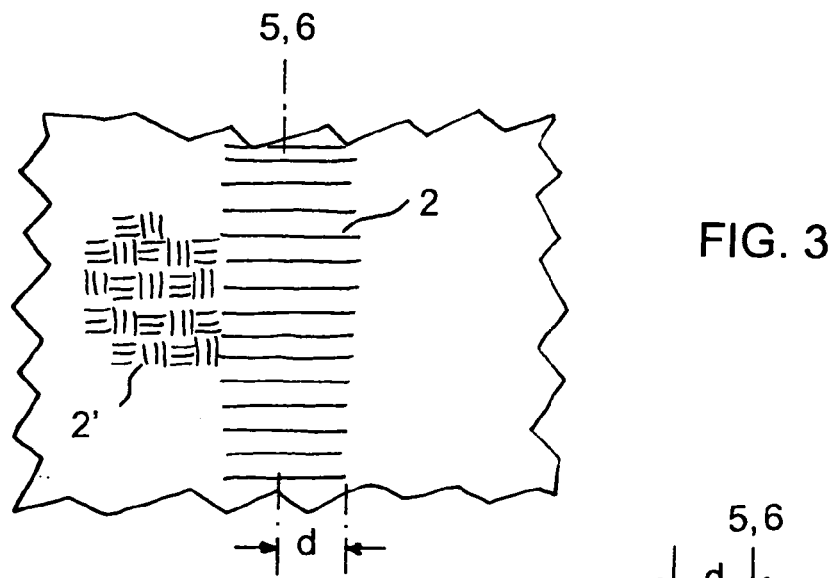
FIG. 3 is a similar view illustrating an alternative embodiment.
Figure 2:
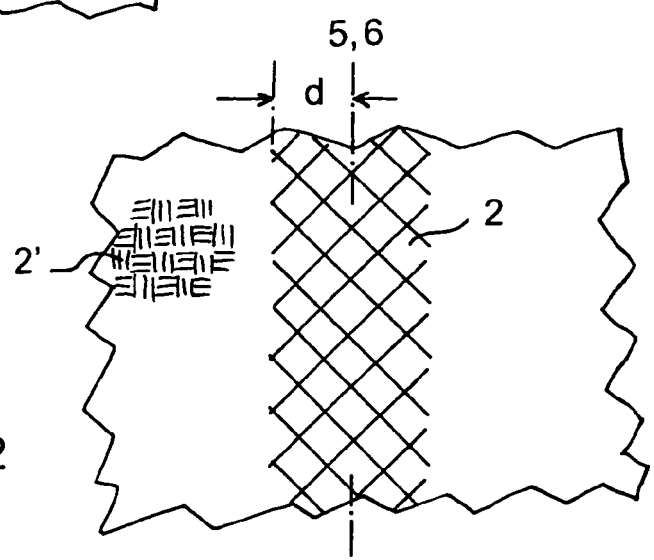
FIG. 2 is an open plan view, with the upper layer omitted, onto the hinge apparatus of FIG. 1.

Reference is had in this context to FIGS. 2 and 3, where two exemplary assemblies are illustrated in a plan view with the upper layer 3 removed on both sides of the joint 5.

When a material reinforced by a woven fabric is used for the inflectable layer 2, this material is preferably disposed in the layer 2 such that the crossing warp and fill threads of the woven fabric extend at +45° and −45° to the separating joints, as shown in FIG. 2. This ensures uniform distribution of the load on the warp and fill threads.

When the inflectable layer 2 is reinforced by a UD non-crimped fabric, the material is preferably disposed in the layer 2 such that the fibrous strands extend perpendicularly to the separating joint, as shown in FIG. 3. The ensures a reinforcement appropriate to loading.

The separating joints 5, 6 in the layers 3 and 4 are formed as grooves of V shaped or U shaped cross section. Separating joints of V shaped cross section are preferred, since the bared surface of the material 2 is minimal as a result (ideally only along the line where the groove flanks meet).

The figure is a schematic view of the construction of a preferred embodiment of the inventive hinge 1. The use of flexible material is limited to the immediate environment of the line of inflection. This embodiment of hinge 1 comprises first and second outer layers 3, 4 of a fiber reinforced composite material of high strength and stiffness, for example CFRP, each having a separating joint 5, 6 along the line of inflection, and an interlayer 2', likewise formed of a fiber reinforced composite material of high strength and stiffness, for example CFRP, between the outer CFRP layers 3, 4. The interlayer 2' is interrupted along the buckling line, or line of inflection, and an buckling strip 2, or inflectable strip 2, composed of an aramid fiber laminate for example, is embedded in the region of this interruption. The strip preferably extends in each case to a distance d of approximately 15 to 20 mm to both sides of the line of inflection. Above and below the inflectable strip 2 there are the separating joints 5, 6 along which the inflectable strip 2 is inflected or buckled when the hinge is actuated.

The hinge depicted in the figures is produced by initially fabricating the strip 2 by molding a laminate of the desired thickness by superposing a plurality of plies of aramid fiber material. Each new laid aramid fiber ply is coated with the matrix forming polyurethane resin. The stack is subsequently pressed together and strips having the desired dimensions are cut from the laminate thus produced. When the inflectable material 2 is for example to have an expansion of 15 to 20 mm to both sides of the line of inflection, this accordingly requires strips from 30 to 40 mm in width.

The strip 2 is placed on the precursor, formed by superposing CFRP prepregs in a conventional manner, of the first CFRP layer 3. On both sides of the strip 2, precursors for the CFRP layer 2' are formed by superposing an appropriate number of further plies of CFRP prepreg, the thickness of the precursors being equal to that of the strip 2 in the hinge.

The edges of layers 2 and 2' are in direct abutment. The plies of CFRP prepreg required for forming the CFRP layer 4 are laid directly on top.

The layered construction thus obtained is subsequently cured in a conventional manner, for example under pressure in a press. In the cured state, the layers 3 and 4 are provided with the separating joints 5, 6 by mechanical working.

The bonding between the aramid fiber reinforced layer 2 and the CFRP layer 3 or 4 is improved when the surfaces of the aramid fiber reinforced layer have been roughened. This can be achieved by laminating the stack of aramid fiber plies between two layers of peel ply. Appropriate materials would be known to one skilled in the art. The peel plies are peeled off the aramid strip 2 immediately before the aramid strip is placed on the CFRP layer 3 or, respectively, immediately before the CFRP layer 4 is put in place, and leave behind a roughened surface.

Stress tests have shown that the hinges of the present invention reliably execute more than 50,000 folding cycles without signs of wear.

The hinge of the present invention can be used for example for positioning a headholder for radiography. Inflecting the hinge along the separating joints causes the headholder, which has its own supporting mechanism, to turn from the horizontal position upward or downward by the desired angle, for example ±15°. Tests with prototypes have shown that the X-ray transparency of the hinge of the present invention is sufficient, so that the quality of the radiographs is not impaired.

This application claims the priority, under 35 U.S.C. § 119, of European application EP 05 014 009.4, filed Jun. 29, 2005; the prior application is herewith incorporated by reference in its entirety.

We claim:

1. A hinge apparatus, comprising:
   first and second outer layers of a fiber-reinforced composite material of high strength and stiffness;
   each of said first and second outer layers having a separating joint formed therein along a buckling line;
   an interlayer of a fiber-reinforced composite material of high strength and stiffness disposed between said first and second outer layers; and
   a strip of material integrated in and interrupting said interlayer in a region of said buckling line, said strip of material being formed of inflectable fiber-reinforced plastic having a resin matrix throughout an entirety of said strip, and having a width of approximately 15 to 20 mm to either side of said buckling line, said strip of material forming a hinge configured to inflect along said separating joints when the hinge apparatus is actuated;
   said first and second outer layers, said interlayer, and said strip of material being transparent to x-rays.

2. The hinge apparatus according to claim 1, wherein said inflectable fiber-reinforced plastic of said strip of material contains aramid fibers and a matrix of polyurethane resin.

3. The hinge apparatus according to claim 2, wherein said inflectable fiber-reinforced plastic layer has a roughened surface.

4. The hinge apparatus according to claim 1, wherein said composite material is a carbon fiber-reinforced plastic with a matrix of epoxy resin.

5. In combination with a medical or technical X-ray device, the hinge apparatus according to claim 4.

6. The hinge apparatus according to claim 1, wherein said reinforcing fibers are present in said composite materials in the form of wovens, ribbons, non-crimped fabrics, or unidirectional non-crimped fabrics.

7. The hinge apparatus according to claim 1, wherein said inflectable plastic material is reinforced by a woven fabric disposed in the region of said hinge with an orientation of crossing warp and fill threads of said woven fabric extending at substantially +45° and −45° to said separating joints.

8. The hinge apparatus according to claim 1, wherein said inflectable plastic material is reinforced by a unidirectional non-crimped fabric disposed in a region of said hinge with fibrous strands of said non-crimped fabric extending substantially perpendicularly to said separating joints.

9. The hinge according to claim 1, wherein said separating joints are formed with a V-shaped or U-shaped cross section.

10. A hinge apparatus, comprising:
    a first layer of fiber-reinforced material having a high degree of stiffness;
    a second layer of fiber-reinforced material having a high degree of stiffness;
    said first and second layers being mutually parallel layers;
    an intermediate layer sandwiched between said mutually parallel layers;
    each of said mutually parallel layers having a separating joint formed therein opposite one another defining a line of inflection substantially exposing said intermediate layer and defining an articulation hinge of the hinge apparatus;
    said intermediate layer being formed of flexible fiber-reinforced composite material having reinforcing fibers with a high flexural strength in a resin matrix extending across said line of inflection;
    said first and second layers and said intermediate layer being transparent to x-rays.

11. The hinge apparatus according to claim 10, wherein said intermediate layer is formed with two interlayers integrated between said mutually parallel layers and a strip of material between and connecting said two interlayers and being disposed substantially symmetrically about said line of inflection and projecting a distance of several millimeters into between said mutually parallel layers on either side of said separating joint.

12. The hinge apparatus according to claim 10, wherein said flexible fiber-reinforced composite material is configured to withstand repeated hinge deflections at said line of deflection numbering upward of $10^3$.

* * * * *